UNITED STATES PATENT OFFICE.

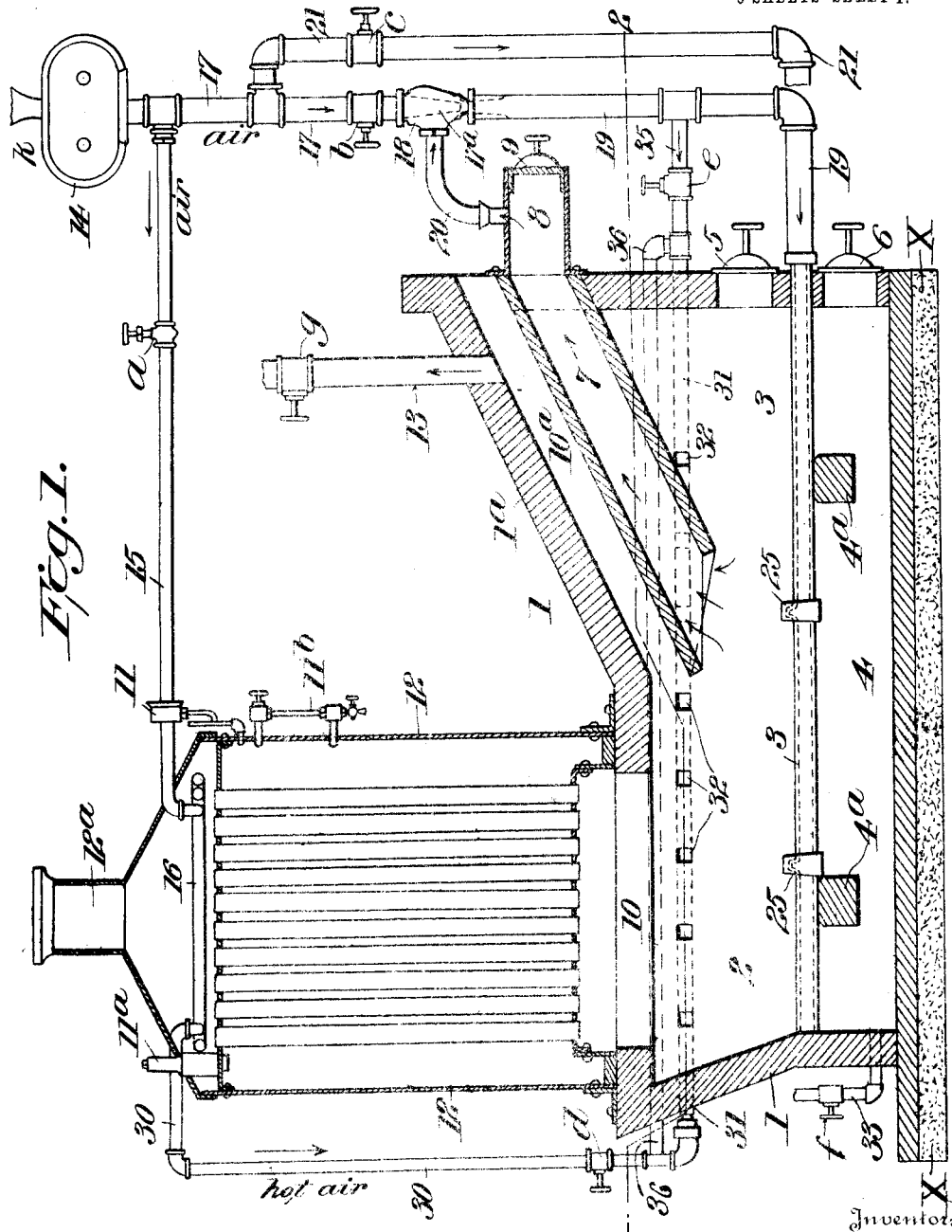

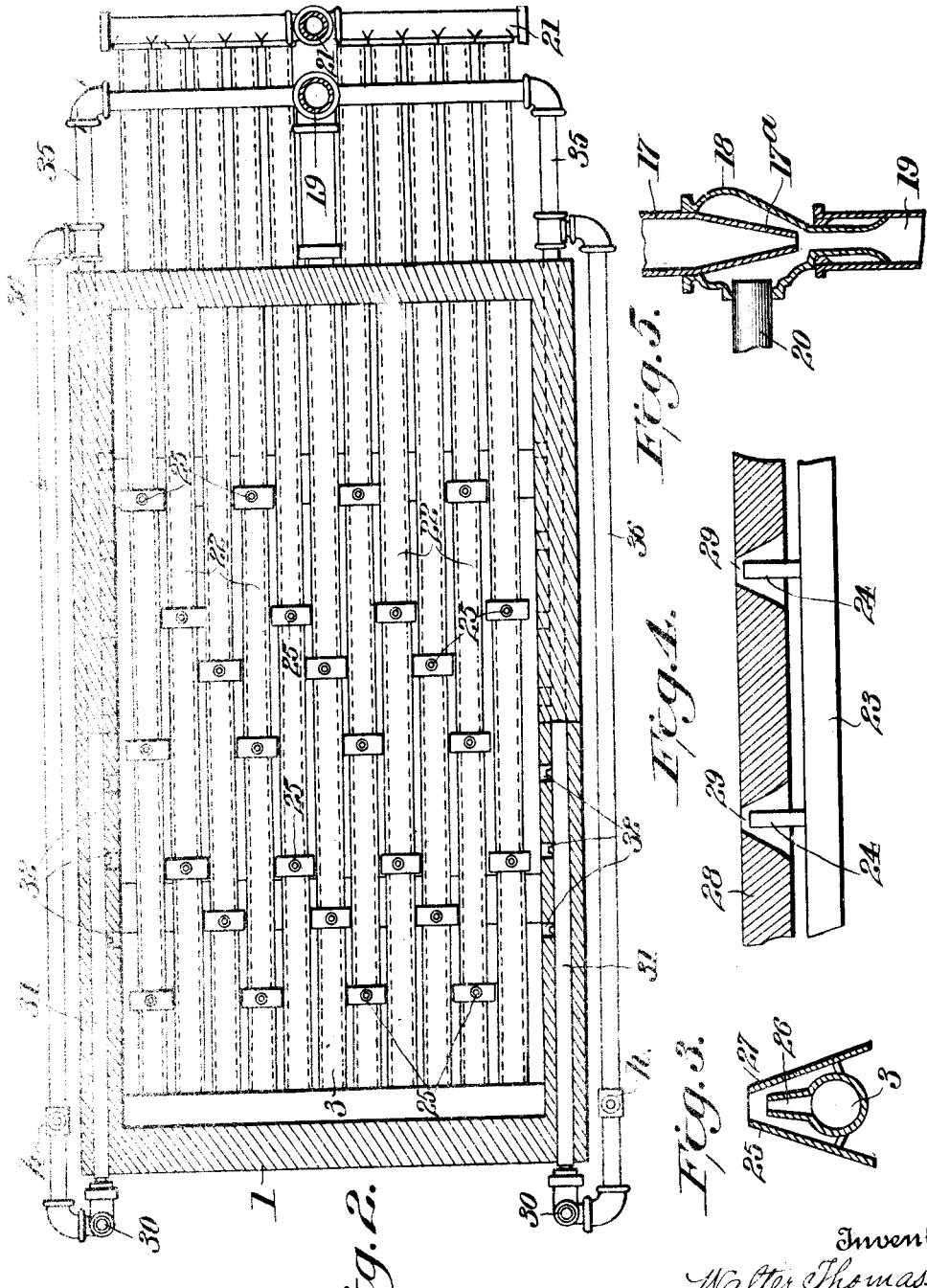

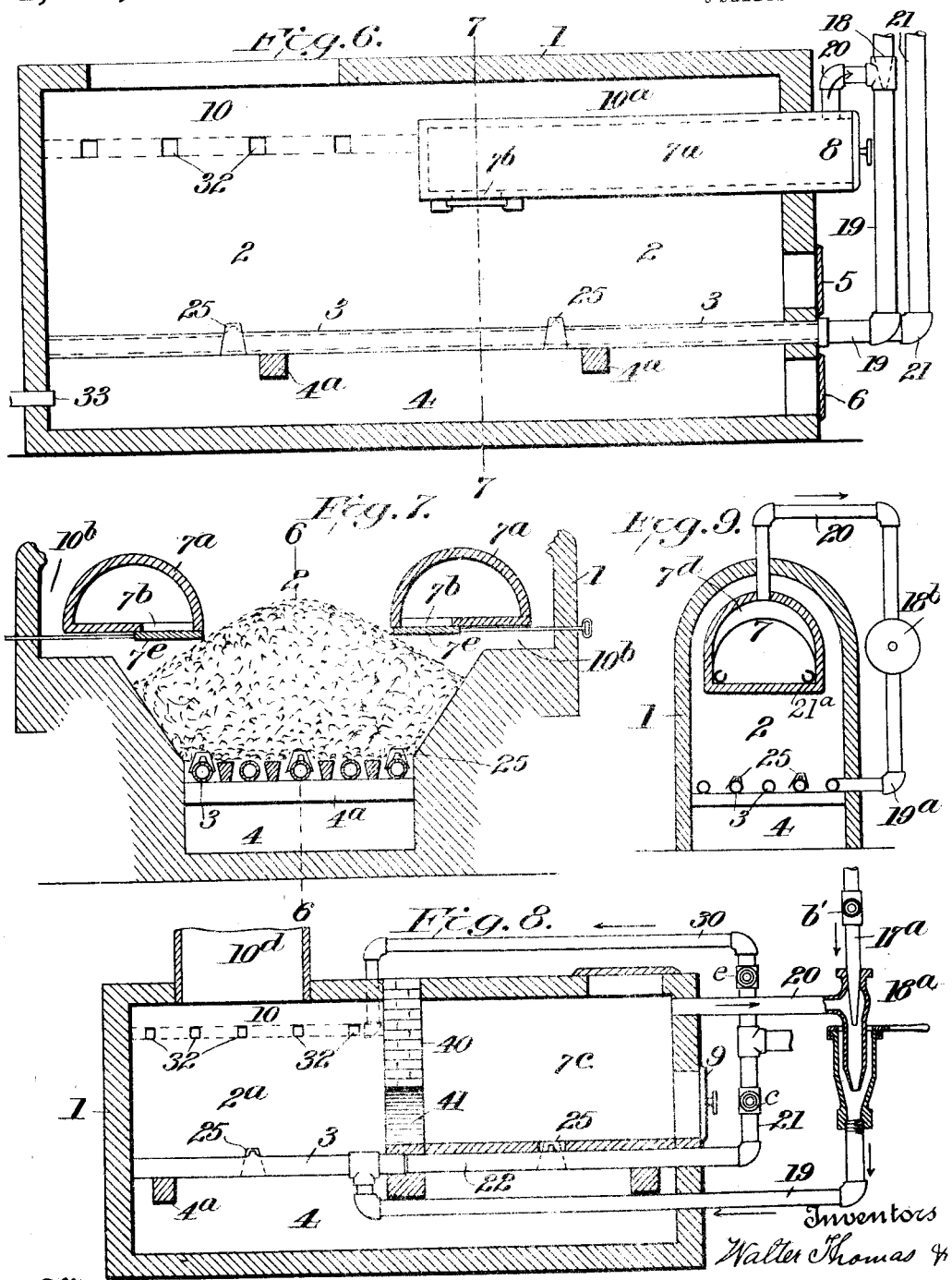

WALTER THOMAS AND ALBERT EDWARD MAINWARING, OF NANAIMO, BRITISH COLUMBIA, CANADA.

HEAT-GENERATING FURNACE.

1,128,199.  Specification of Letters Patent.  Patented Feb. 9, 1915.

Application filed July 9, 1914. Serial No. 849,924.

*To all whom it may concern:*

Be it known that we, WALTER THOMAS and ALBERT E. MAINWARING, subjects of the King of Great Britain, residing at Nanaimo, in the county of Nanaimo and Province of British Columbia, Canada, have invented certain new and useful Improvements in Heat-Generating Furnaces, of which the following is a specification.

This invention relates to a heat generating furnace, adapted to burn low-grade fuel for heating steam boilers, including marine and locomotive boilers, and other industrial purposes, such as heating bakery ovens, brick and pottery kilns, ore roasting furnaces, lime and cement kilns or retorts, houses, large buildings, etc., in an economical and scientific manner.

At the present time there are large quantities of low-grade fuel, such as mine waste or refuse, lignite and lignite coal, wood waste and other waste material throughout the continent of America, and in fact the whole world, which cannot or is not successfully utilized for heating purposes, for the reason that the furnaces in general use are not adapted for generating high and uniform heat from such class of fuel. There are mountains of cheap low-grade fuel in Canada and the United States which is not used for heating purposes by reason of the lack of a suitable furnace or generator to consume it, to gasify it, burn the hydrocarbon gases, produce perfect combustion, and develop or obtain the highest possible calorific value from such fuel.

We have devised a heat generator which overcomes the difficulties heretofore encountered in burning low-grade fuel, and which will produce the beneficial and advantageous results above mentioned in a thoroughly practical and scientific manner. We will, with our heat generator absolutely do away with the smoke nuisance and at the same time effectively utilize the cheap low-grade fuels, as we have conclusively demonstrated by months of practical operations of a number of our heat generating furnaces.

The general object of our invention, therefore, is to provide for generating high heat under perfect control, from low-grade fuels, by wholly or partially coking the fuel, liberating the rich hydrocarbon gases, completely burning such gases with hot air, producing perfect combustion, also burning the coked fuel and maintaining a regulated temperature at any desired degree.

One of the special objects of our invention is to provide for coking and gasifying low-grade fuel and producing two rates of combustion at variable but controlled temperatures,—one a comparatively rapid combustion of the gases at a high temperature, and a slower combustion of the fuel at a lower temperature, whereby any desired heat or temperature may be obtained which is best suited to the work to be accomplished.

Another object is to provide for subjecting coal or a low-grade fuel to carbonization or coking in a semi-retort, thereby liberating the volatile hydrocarbon gases and vapors and injecting the same by means of a jet or current of high pressure air into and through a body of ignited or incandescent coked fuel, whereby the rich hydrocarbon vapors are converted into fixed gas, composed principally of hydrogen, light carbureted hydrogen and carbon monoxid; burning such gases with heated secondary air supply in a combustion zone,—producing perfect combustion and producing the highest possible efficiency. Both the primary and the secondary combustion in our heat generator are under perfect control, so that the exact temperature required may be obtained.

Other objects and purposes of our invention will appear in the detail description of the apparatus and its operation below.

The matter constituting our invention will be defined in the claims.

We will now describe the details of construction and operation of our heat generating furnace by reference to the accompanying drawings, in which—

Figure 1, represents a longitudinal section, with parts in elevation, of our furnace, showing a tubular steam boiler mounted thereon. Fig. 2, represents a horizontal section through the furnace on the irregular line 2—2, Fig. 1. Fig. 3, represents a sectional detail on enlarged scale, showing a Bunsen injector on a hollow grate bar. Fig. 4, represents a detail view of a modified construction of grate bar showing a Bunsen injector. Fig. 5, represents a sectional view of the air blast injector and gas exhauster. Fig. 6, represents a longitudinal section of a marine boiler furnace on line 6—6, Fig. 7. Fig. 7, represents a transverse section of the same on line 7—7, Fig. 6. Fig. 8, represents a longitudinal section of a modified arrangement of heat generating furnace. Fig. 9, represents a transverse section showing modifications.

We construct the walls of our heat generating furnace 1, of brick and may line it with fire brick, and erect on a concrete foundation X, and with an upwardly inclined top 1ª, to provide a heating chamber for the inclined coking retort. The furnace 1, is provided with a fuel and primary combustion chamber 2, a grate composed of hollow bars 3 and 22 resting on cross supporting bars 4ª, and an ash pit 4. The chamber 2, is provided with a front opening and door 5, for clinkering and stoking the bed of fuel. An ash door 6, is provided. The coking and fuel feeding retort 7, may be set in an inclined position as shown, or in a vertical or horizontal position, and is provided with a mouth piece 8, having a tight fitting lid or door 9, constructed in any well known manner. The retort is supported in a combustion chamber 10ª, which completely surrounds and incloses it, so that it may be subjected to a high temperature for coking the coal or other low grade fuel and liberating rich volatile hydrocarbon gases and vapors. A combustion chamber 10, of comparatively large capacity is provided above the body of fuel on the grate for the secondary and complete combustion of gases. At the rear and horizontal part of the top of the furnace is seated a vertical tubular boiler 12, having a stack 12ª, a steam pressure gage 11, a safety valve 11ª, and a water gage 11ᵇ. An outlet pipe 13, having a valve $g$, may connect with the combustion chamber 10ª, for conducting off hot gaseous products to any desired place of use.

We wish it understood that instead of mounting a steam boiler on our heat generator, a baking or roasting oven, or a kiln or other device to be heated may be located at the rear of the generator or connected therewith in any suitable manner for most effectively utilizing the large volume of highly heated products generated.

A positive air blower 14, of any well known kind, and having an air inlet $k$, is mounted in any convenient position, and has an air blast discharge pipe 17, with which connects an air supply pipe 15, having a valve $a$, leading to a secondary air heating coil 16, located in the top of the boiler or in any flue or conduit for hot gases, whereby it may be heated. The air blast pipe 17, projects into an injector 18, in which it terminates with a contracted nozzle 17ª, Fig. 5, to act as an exhauster for drawing gas and vapor from retort 7. A pipe 20, connects with the mouth-piece 8, and with the injector as shown. At the outlet of the injector, a pipe 19, is extended to the hollow grate bars 3. Pipe 19, will therefore conduct mixed gas and high pressure air to part of the hollow grate bars, particularly to those marked 3. A second branch pipe 21, having a valve $c$, connects with pipe 17, and leads to the side hollow grate bars 22, in the furnace.

Any desired number of Bunsen injectors 25, will be connected in the grate bars 3, and 22. To form an injector, a nipple 26, Fig. 3, is screwed into the top of the hollow pipe or bar 3, and is inclosed in an injector bell 27, which is held in place by a spider, or in other desired manner. The construction of grate bar and injector may be modified as shown in Fig. 4, in which is shown a solid grate bar 28, having conical openings 29. A pipe 23, for air blast or mixed air and gas is arranged below bar 28, and is provided with a nipple 24, projecting up into the conical opening or bell 29, for producing a Bunsen burner flame. These Bunsen injectors will draw air from the ash pit and mix it with the gas or gas and air from the hollow pipes 3, and force it up into the body of ignited or incandescent fuel as the case may be. The Bunsen injectors 25, on the air bars 22, will also draw additional air from the ash pit and force it up into the body of fuel, producing a forced draft and rapid combustion particularly of the rich gases and vapors supplied by pipe 3. A hot air pipe 30, having a valve $d$, connects with the air heating coil 16, at the top of the boiler and with the secondary air duct 31, in the side walls, which ducts have numerous ports 32, opening into the secondary combustion chamber 10, above the fuel. A branch pipe 35, having a valve $e$, connects with pipe 19, and leads into the duct 31, or connects by a pipe 36, having a valve $h$, with air pipe 30, at the rear end of the furnace, so that the mixed gas and air blast can be passed with hot air from pipe 30, into the secondary air duct 31. We have found it advantageous in some conditions to thus burn all or part of the rich hydrocarbon gas in chamber 10, above the body of fuel. Evidently part of the gas may be burned in the Bunsen injectors at the grate and part in chamber 10, above the solid fuel, according to the character of the gas and other conditions present. A water supply pipe 33, having a valve $f$, connects with the ash pit and supplies it with the necessary water to be evaporated. The water vapor or steam is drawn into the Bunsen injectors and forced into the incandescent fuel where it is decomposed into hydrogen and carbon monoxid, thereby adding to the supply of combustible gas in the secondary combustion chamber.

The operation of our heat generator is very simple and may be conducted as follows: A body of fuel is placed on the grate and ignited and burned, and the coking retort charged with coal or waste fuel. The air blower may be started and an air blast supplied to the hollow grate bars. As the temperature rises in the furnace, the fuel in retort 7, will be coked, and hydrocarbon gases evolved. High pressure air will now be admitted to the injector 18, which will draw the gas and vapor from the retort and force them with air into the Bunsen injectors 25, and thence into the incandescent fuel where primary combustion is wholly or partially effected. Steam will also be drawn into the injectors and discharged into the fuel where it will be decomposed. All the gases will be broken up to form hydrogen, light carbureted hydrogen and carbon monoxid. The volume of gas will be largely increased and the hot gas passing through the body of fuel will be met by, and intimately mixed with the secondary hot air from the ports 32, resulting in perfect combustion in chambers 10 and $10^a$, around the coking retort. The so-called smoke will be completely consumed and the smoke nuisance thus overcome. The coke will be, at suitable intervals, pushed down into chamber 2, and fresh fuel supplied to the retort in any desired manner. The body of fuel in chamber 2, will be regulated and stoked by bars through the door 5. The ashes will be removed as required through door 6. A shallow body of water will be maintained in the ash pit to supply steam as above described. Two different rates of combustion may be established and maintained, first the slower combustion of the fuel supplied with air from the hollow grates 22, producing a comparatively low temperature; and second, a more rapid combustion of the gases with air, producing a higher temperature. Both of these rates of combustion will be controlled by controlling the air and gas admitted to the combustion chambers. Any desired heats or temperatures can thus be produced and maintained, as may be best suited to the work to be performed.

The arrangement of coking retorts $7^a$ shown in Figs. 6 and 7 is particularly adapted for marine steam boiler furnaces, in which a deep fuel bed is preferably used in chamber 2. The retorts $7^a$ are supported on shelves at each side of the furnace and may be partially surrounded with flues $10^b$ for hot products, and are provided with a number of bottom openings $7^b$ for discharge of coke into the combustion chamber. The construction and operation of the other parts may be substantially as above described.

In case a small, inexpensive installation is desired, the coking chamber $7^c$ and fuel chamber $2^a$, Fig. 8, are made in single inclosing walls and separated by a partition 40, having an opening 41 connecting the chambers, whereby hot coke may be pushed from the coking chamber back into the combustion chamber. One Bunsen burner 25 on an air pipe 22 may open into the coking chamber for supporting a low or smothered combustion, suitable for coking or charring the fuel. The chamber $2^a$ will be provided with hollow bars and injector burners for gas and air as above described. The hot products may be passed off through a flue $10^d$ to any desired place of use. A steam-jet gas exhauster and air blower $18^a$ may be used with this heat generator. The coking retort may have an enlargement $7^d$, to provide a gas receiving chamber when the retort is opened for feeding or discharging fuel. A rotary gas exhauster $18^b$ may be connected in the gas outlet pipe 20, instead of an air or stem jet exhauster previously described. Air inlet pipes $21^a$ may be placed in, or connected with, the retort or chamber 7 for supplying the requisite amount of air to hasten the coking operation. Gas drawn by the exhauster $18^b$ may be forced directly into the hollow bars 3, and thence through the injector burners, thereby drawing in air or steam and injecting it into the body of incandescent fuel in chamber 2, where complete combustion is effected and a high heat produced.

The high efficiency of our generator is largely effected by the operation of breaking up the heavy hydrocarbon vapors and gases, generated in the retort, by the operation of forcing the gases, vapors and air directly into certain areas of the incadescent fuel, as by means of the Bunsen injectors. This we have found much more effective than supplying air under pressure under the whole grate area, which latter we have found absolutely unsuitable for burning low-grade fuel. By use of a suitable number of Bunsen injectors and air under pressure, clinker is formed in cone shaped chunks around and over each injector and can be easily removed without withdrawing the fire or lowering the temperature of the generator.

Having described our invention, what we claim and desire to secure by Letters Patent, is:—

1. In a heat generating furnace, the combination with a coking and gasifying retort, of an air blast jet device for drawing off the hydrocarbon vapors and gases, mixing them with air and pipe connections for forcing the mixture under pressure at localized points directly into a body of ignited or incandescent fuel in the furnace for converting such vapors and gases into fixed gas and producing perfect combustion of the fuel.

2. In a heat generator, the combination with a fuel and combustion chamber, of a coking and gasifying retort opening into said fuel chamber, an injector burner opening into the fuel chambers, means connecting with the retort for drawing off the liberated hydrocarbon vapors and gases, mixing air therewith and forcing the mixture under pressure into said injector burner and thence into the body of incandescent fuel for converting the volatile vapors into fixed gas, burning the gas and producing perfect combustion of the fuel.

3. In a heat generator, the combination with a fuel and combustion chamber, of a coking and gasifying retort through which fuel is fed to said chamber, means connecting with the retort for drawing off the liberated hydrocarbon vapors and gases, mixing air therewith, and forcing the mixture to the body of ignited fuel in said chamber, hollow grate bars, having openings into the fuel chamber, and a pipe connecting the gas and air forcing device with said hollow grate bars for producing perfect combustion of the fuel and gases.

4. In a heat generator, the combination with a fuel and combustion chamber, of a coking and gasifying retort through which fuel is fed to said chamber, means connecting with the retort for drawing off the liberated hydrocarbon vapors and gases, mixing air therewith and forcing the mixture to the body of ignited fuel in said chamber, a hollow grate bar having one or more Bunsen injectors connecting therewith and opening into the fuel chamber, and a pipe connecting the gas and air forcing device with said hollow bar for producing perfect combustion of the fuel and gases.

5. In a heat generator, the combination with a fuel and combustion chamber, of a coking and gasifying retort inclosed in, and opening into said chamber, an injector exhaust device connecting with the retort and having an air inlet, a hollow grate bar having one or more Bunsen injectors opening into the fuel chamber, and a pipe connecting the injector with said hollow bar for producing perfect combustion of the fuel and gases.

6. In a heat generator, the combination with a fuel and combustion chamber, of a coking and gasifying retort opening therein, an air and gas injector, an air forcing device connecting with the injector, a gas escape pipe connecting the retort with the injector, a grate bar having one or more Bunsen injectors, and a pipe connecting the air and gas injector with said Bunsen injectors for producing perfect combustion of the fuel and gases.

7. In a heat generator, the combination with a fuel and combustion chamber, of a coking and gasifying retort opening therein, a positive air blower, an injector exhaust device, a pipe connecting the blower with, and terminating in a nozzle in said injector device, an exhaust pipe for volatile gases connecting the retort with said injector and a pipe leading from the injector to the grate of the fuel chamber for supplying mixed air and gas to a body of incandescent fuel.

8. In a heat generator, the combination with a fuel and combustion chamber, of a coking and gasifying retort opening therein, an injector exhaust device, a positive air blower having a discharge pipe terminating in a nozzle in said device, a gas pipe connecting the retort with said exhaust device, a grate having a Bunsen injector or burner, and a pipe connecting said injector exhaust device with the burner and grate, for supplying a blast of mixed air and gas under pressure to the body of fuel on the grate and producing perfect combustion.

9. In a heat generator, the combination with a fuel chamber and a combustion chamber above the same, of a coking and gasifying retort opening into the fuel chamber, said combustion chamber having a secondary air supply duct or flue and ports opening into the same above the fuel, an injector exhaust device connecting with the retort and having an air inlet, a hollow grate bar having one or more injector burners, and a pipe connecting the injector exhaust device with said hollow bar for producing perfect combustion of the fuel and gases.

10. In a heat generator, the combination with a fuel chamber and a combustion chamber above the same, of a coking and gasifying retort opening into the fuel chamber, said combustion chamber having a secondary air supply duct and ports above the fuel, an air blower, an injector exhaust device, a pipe connecting the blower with the exhaust device and a gas pipe connecting the retort with the exhaust device, hollow grate bars, a pipe for gas and air connecting the exhaust device with one of the hollow bars, and an air pipe connecting the blower with other hollow bars, whereby two rates of combustion may be effected and a controlled temperature produced.

11. In a heat generator, the combination with a fuel chamber and a combustion chamber above the same and having a secondary air supply duct and ports, of a coking and gasifying retort opening into the fuel chamber, an air blower, an air heater in an outlet flue for hot gaseous products, a pipe connection from the blower to the heater, a pipe connection from the heater to said secondary air duct, an injector exhaust device, pipe connections from the blower and from the retort to said exhaust device, hollow grate bars, and pipe connections respectively from the exhaust device and from the blower to said grate bars.

In testimony whereof we affix our signatures in presence of two witnesses.

WALTER THOMAS.
ALBERT EDWARD MAINWARING.

Witnesses:
AUSTIN J. WRIGHT,
J. W. WRIGHT.